US011737473B2

(12) United States Patent
Basavaraju et al.

(10) Patent No.: US 11,737,473 B2
(45) Date of Patent: Aug. 29, 2023

(54) PROCESS OF AROMA RECOVERY FROM TEA LEAF

(71) Applicant: EKATERRA TEA MANUFACTURING USA LLC, Wilmington, DE (US)

(72) Inventors: Lokesh Basavaraju, Bangalore (IN); Shreya Mukherjee, Kolkata (IN); Swathy Palagiri, Hyderabad (IN); Sreeramulu Guttapadu, Bangalore (IN)

(73) Assignee: EKATERRA TEA MANUFACTURING USA LLC, Wilmington, DE (US)

( * ) Notice: Subject to any disclaimer, the term of this patent is extended or adjusted under 35 U.S.C. 154(b) by 180 days.

(21) Appl. No.: 17/294,589

(22) PCT Filed: Nov. 8, 2019

(86) PCT No.: PCT/EP2019/080687
§ 371 (c)(1),
(2) Date: May 17, 2021

(87) PCT Pub. No.: WO2020/108956
PCT Pub. Date: Jun. 4, 2020

(65) Prior Publication Data
US 2022/0000139 A1    Jan. 6, 2022

(30) Foreign Application Priority Data

Nov. 27, 2018 (EP) .................................... 18208517

(51) Int. Cl.
A23F 3/42    (2006.01)
A23F 3/08    (2006.01)

(52) U.S. Cl.
CPC .............. *A23F 3/426* (2013.01); *A23F 3/08* (2013.01)

(58) Field of Classification Search
CPC ................................. A23F 3/08; A23F 3/426
See application file for complete search history.

(56) References Cited

U.S. PATENT DOCUMENTS

| 4,639,375 A * | 1/1987 | Tsai ......................... A23F 3/10 426/597 |
| 4,717,579 A * | 1/1988 | Vietti ...................... A23F 3/163 426/597 |
| 4,748,033 A * | 5/1988 | Syfert ..................... A23F 3/163 426/597 |
| 8,273,395 B2 * | 9/2012 | Colliver ................... A23F 3/14 426/597 |

FOREIGN PATENT DOCUMENTS

| WO | WO2011151237 | 12/2011 |
| WO | WO2013075912 | 5/2013 |
| WO | WO2013092153 | 6/2013 |
| WO | WO2017063906 | 4/2017 |

OTHER PUBLICATIONS

Search Report and Written Opinion in EP18208517; dated May 3, 2019.
Mitsuya Shimoda et al.; Comparison of Volatile Compounds among Different Grades of Green Tea and Their Relations to Odor Attributes; Comparison of Volatile Compounds among Different Grades of Green Tea and Their Relations to Odor Attributes; Jun. 1, 1995; 1621-1625; - p. 1621—right-hand column, line 3-line 9; Abstract; Tables 2,3; 43 No. 6 (Jun. 1, 1995);.
Search Report and Written Opinoin in PCTEP2019080687; dated Jan. 29, 2020.
IPRP2 in PCTEP2019080687; Nov. 5, 2020.

* cited by examiner

*Primary Examiner* — Anthony J Weier
(74) *Attorney, Agent, or Firm* — Foley & Lardner LLP

(57) ABSTRACT

The present invention relates to a process for aroma recovery from tea leaf including the steps of: incubating fresh tea leaf at a temperature in the range 4 to 80° C. under anaerobic conditions for a period of 4 to 72 hours; subjecting the incubated leaf to comminution to produce dhool; fermenting the comminuted dhool; and recovering aroma from the dhool while partially drying the dhool in a low-convection dryer.

11 Claims, No Drawings

PROCESS OF AROMA RECOVERY FROM TEA LEAF

CROSS-REFERENCE TO RELATED APPLICATIONS

This application is a U.S. 371 National Stage Application of PCT International Application No. PCT/EP2019/080687, with international filing date of Nov. 8, 2019, which claims the benefit of and priority to European patent application No. 18208517.5 filed Nov. 27, 2018, the contents of which are incorporated herein by reference in their entireties.

FIELD OF THE INVENTION

The present invention relates to a process for aroma recovery from tea leaf. More particularly the present invention relates to a process for recovering aroma with a high floral to green ratio from tea leaf.

BACKGROUND OF THE INVENTION

Tea is one of the most popular beverages in the world. It is believed that consumption of tea refreshes our mind. Polyphenols that are present in tea are also considered to be good for human health. There are varieties of tea available in the market, e.g. black tea, green tea, oolong tea, white tea, etc. Out of these, black tea is most prevalent. Black tea is generally prepared by a process which includes the steps of withering, macerating, fermenting and firing/drying. The characteristic colour, flavour and aroma of black tea are largely produced during fermentation. The term 'fermentation' is traditionally used in the tea processing to refer to enzymatic oxidation. The tea is dried at high temperature after fermentation to arrest the enzyme action and to bring down the moisture to a low level.

Black tea is predominantly characterized by its rich red and bright coloured infusion. On the other hand, green tea liquor is light with very different taste and attributes to that of black tea. However, whatever kind of tea is consumed, aroma is one of the main characteristics feature of any tea product.

The process of preparing green tea and black tea from fresh tea leaves significantly differs with respect to the steps involved. Drying is one of the key step that needs to be followed for any processing any kind of tea. The drying step reduces the moisture content of the tea leaf from about 70% by weight to less than 5% by weight. However, the drying step leads to significant loss of aroma from the tea leaf because of high temperature associated with the drying step.

Therefore, capturing aroma from tea leaf while processing the leaf is an area of interests for the tea industry.

There is prior art which discloses aroma recovery from tea leaf and/or tea extracts.

U.S. Pat. No. 5,182,926 (Nestec S.A.), discloses a process for the collection and recovery of aroma frost from gases evolved during the processing of a beverage such as coffee, tea or cocoa.

WO2007/039018 (Unilever) describes a process for manufacturing a leaf tea product. The process comprises the steps of providing fresh tea leaf, recovering aroma from the fresh tea leaf, and drying the fresh tea leaf to form the leaf tea product. The aroma is recovered whilst at least partially drying the fresh leaf in a low-convention dryer.

WO 2011/069788 (Unilever) describes a process for the recovery of volatile aroma compounds from a vegetable material comprising the steps of: contacting the vegetable material with a gas in a dryer wherein the amount of moisture in the gas entering the dryer is less than 15 g/kg dry gas; contacting the dryer exhaust gas stream with water vapour or steam to obtain a gaseous mixture; and condensing the gaseous mixture to recover a condensate comprising volatile aroma compounds.

Though there is prior art disclosing different processes of aroma recovery, an aroma which is predominantly floral in nature is not disclosed. We have found that tea aroma enriched with floral notes is preferred by many consumers as higher floral notes provide very distinctive organoleptic properties.

It is therefore an object of the present invention to provide a process for recovering aroma from tea leaves.

It is another object of the present invention to provide a process for recovering aroma from tea leaves with higher floral notes.

The present inventors have surprisingly found that a process of aroma recovery from the fresh tea leaves, which includes an initial step of anaerobic incubation of the fresh leaves under certain conditions, produces a tea aroma with higher floral notes than regular tea aroma thereby satisfying one or more of the above-mentioned objects.

SUMMARY OF THE INVENTION

Accordingly, in a first aspect there is provided a process for recovering aroma from tea leaf comprising the steps of:
a. incubating fresh tea leaf at a temperature in the range 4° C. to 80° C. under anaerobic conditions for a period of 4 to 72 hours;
b. subjecting the incubated leaf to comminution to produce dhool;
c. fermenting the comminuted dhool; and
d. recovering aroma from the dhool while partially drying the dhool in a low-convection dryer.

In a second aspect the present invention provides a tea aroma wherein floral aroma to green aroma ratio is greater than 2.

These and other aspects, features and advantages will become apparent to those of ordinary skill in the art from a reading of the following detailed description. For the avoidance of doubt, any feature of one aspect of the present invention may be utilized in any other aspect of the invention. The word "comprising" is intended to mean "including" but not necessarily "consisting of" or "composed of." In other words, the listed steps or options need not be exhaustive. It is noted that the examples given in the description below are intended to clarify the invention and are not intended to limit the invention to those examples per se. Similarly, all percentages are weight/weight percentages unless otherwise indicated. Except in the operating and comparative examples, or where otherwise explicitly indicated, all numbers in this description indicating amounts of material or conditions of reaction, physical properties of materials and/or use are to be understood as modified by the word "about". Numerical ranges expressed in the format "from x to y" are understood to include x and y. When for a specific feature multiple preferred ranges are described in the format "from x to y", it is understood that all ranges combining the different endpoints are also contemplated.

DETAILED DESCRIPTION OF THE INVENTION

"Tea" for the purposes of the present invention means material from *Camellia sinensis* var. *sinensis* and/or *Camel-*

*lia sinensis* var. *assamica*. Especially preferred is material from var. *assamica* as this has a higher level of tea actives than var. *sinensis*.

"Leaf tea" for the purposes of this invention means a tea product that contains tea leaves and/or stem in an uninfused form, and that has been dried to a moisture content of less than 30% by weight, and usually has a water content in the range 1 to 10% by weight (i.e. "made tea").

"Fresh tea leaf" refers to tea leaf, buds and/or stem that have never been dried to a water content of less than 30% by weight, and usually have moisture content in the range 60 to 90%.

"Fermentation" refers to the oxidative and hydrolytic process that tea undergoes when certain endogenous enzymes and substrates are brought together, e.g. by mechanical disruption of the cells by maceration of the leaves. During this process, colourless catechins in the leaves are converted to a complex mixture of yellow and orange to dark-brown polyphenolic substances.

"Black tea" refers to substantially fermented tea. Black tea has different characteristics to green tea. Black tea is more astringent in taste and less bitter than green tea. The redness of black tea liquor is also significantly higher than that of green tea. Black tea also contains higher level of the a flavins.

The present invention provides a process for recovering aroma from fresh tea leaf comprising the steps of:
a. incubating fresh tea leaf at a temperature in the range 4° C. to 80° C. under anaerobic conditions for a period of 4 to 72 hours;
b. subjecting the incubated leaf to comminution to produce dhool;
c. fermenting the comminuted dhool; and
d. recovering aroma from the dhool while partially drying the dhool in a low-convection dryer.

Step (a):

Step (a) includes incubating fresh tea leaf at a temperature in the range 4° C. to 80° C. under anaerobic conditions for a period of 4 to 72 hours. The term "anaerobic conditions" as used herein means that the gas phase in contact with the leaf has less than 3%, preferably less than 2% and more preferably less than 1% oxygen by volume. It is particularly preferred that the gas phase in contact with the leaf is substantially free of oxygen.

The fresh leaf may be selected as two leaves and a bud, three leaves and a bud, or more than three leaves and a bud. The duration of time between plucking the fresh tea leaf and the incubation is preferably less than 24 hours, more preferably less than 12 hours and most preferably less than 8 hours. However, it is possible that the duration of time between plucking the fresh tea leaf and the incubation is longer than 24 hours if the tea leaf is stored at temperature of less than 15° C.

Anaerobic Conditions:

The anaerobic conditions are optionally achieved by:
i. placing the fresh tea leaf in a container, and closing the container, or;
ii. placing the tea leaf in a container, purging a gas essentially free of oxygen through the container, and closing the container, or placing the leaf in an airtight chamber or under vacuum.

Preferably, the anaerobic conditions are achieved by: placing the fresh tea leaf in a container, and closing the container, or placing the tea leaf in a container, purging a gas essentially free of oxygen through the container through the container, and closing the container.

By placing the fresh leaf in a container and closing the container, the oxygen concentration in the gas phase decreases with time and anaerobic conditions are achieved after keeping the container closed for a certain amount of time. The container is closed for a duration of preferably greater than 3 hours, more preferably greater than 4 hours and most preferably greater than 6 hours or even greater than 8 hours.

Alternatively, and more preferably, the anaerobic conditions are achieved by placing the leaf in a container, purging a gas essentially free of oxygen through the container and closing the container. The gas other than oxygen is preferably nitrogen or carbon dioxide, most preferably nitrogen.

Once the container is closed in step i or ii above, there is no particular restriction as to the pressure in the container. The pressure inside the closed container is preferably from $1.33 \times 10^2$ Pa to $1.33 \times 10^5$ Pa, more preferably $1.33 \times 10^3$ Pa to $1.06 \times 10^5$ Pa and most preferably $2.67 \times 10^3$ Pa.

It is preferred that the moisture loss from the leaf during the step is as low as possible. This is advantageously and conveniently achieved by carrying out this step under closed conditions. The incubated tea leaf after this step preferably comprises water in the range of from 70 to 75% by weight.

Incubation Temperature:

Step (a) is at a temperature in the range 4° C. to 80° C., preferably in the range 4° C. to 65° C., more preferably in the range 10° C. to 50° C.

Duration of Anaerobic Incubation:

The time of incubation is in the range of 4 to 72 hours, preferably 4 to 50 hours, more preferably 6 to 30 hours and most preferably 8 to 20 hours.

Step (b):

In this step, the incubated leaf is subjected to comminution. This step of size reduction is preferably carried out by crushing, tearing and curling (known in the art of tea processing as CTC). One or more CTC steps may be carried out. In this step the incubated leaf breaks up and releases enzymes that exist in the leaf.

Alternatively, after the incubation step, the incubated tea leaf is rolled in an orthodox roller or comminuted in a rotorvane, or a combination thereof. During these steps precursors present in the tea leaf become amenable to the enzymes.

In the process of the present invention, there is preferably no step of comminution of the tea leaf before step (a).

Step (c):

The comminuted dhool undergoes fermentation after step (b). Fermentation is preferably carried out by keeping the leaf at a temperature of 10° C. to 60° C. for 15 minutes to 5 hours. Preferably, the temperature of the fermentation is between 25 to 45° C. and more preferably 25 to 40° C. The time for fermentation is preferably 30 minutes to 4 hours, more preferably 1 to 4 hours and most preferably 1 to 3 hours.

Step (d):

In step (d) aroma is recovered from the dhool while partially drying the dhool in a low-convection dryer.

A low-convection dryer is used to recover the aroma. As used herein the term "low-convection dryer" preferably refers to those types of dryers in which the amount of inlet non-condensable gas is less than 20 kg per kg of water evaporated, preferably less than 5 kg per kg of water evaporated, more preferably less than 1.0 kg per kg of water evaporated, more preferably still less than 0.5 kg per kg of water evaporated, and most preferably between 0.001 and 0.05 kg per kg of water evaporated. The term "non-condensable gas" refers to those substances with a boiling point of less than −10° C., preferably less than −20° C. and more preferably less than −35° C. at atmospheric pressure. The non-condensable gas is preferably air.

The various types of dryers which are suitable for the process of the invention include (but are not limited to) one or more of batch and continuous models of dryers such as vacuum dryers, rotary vacuum dryers, vacuum plate dryers, superheated steam dryers, hollow flight evaporators or jacketed screw evaporators. In most of these types of dryers, the heat is transferred by conduction from the surface of the dryers. It is preferred that the heat transfer surface temperature of the low-convection dryers is in the range of 40 to 150° C., more preferably in the range of 90 to 140° C. When dried in the low-convection dryer, it is desirable that the fresh tea leaf is not heated to a temperature higher than 70° C. and is preferably heated to a temperature in the range of 30 to 55° C.

The drying in the low-convection dryer is preferably carried out under vacuum. The preferred ranges of vacuum are such that the pressure is less than $3.04 \times 10^4$ Pa, more preferably in the range of $1.01 \times 10^3$ Pa to $2.03 \times 10^4$ Pa, most preferably in the range $5.07 \times 10^3$ Pa to $1.52 \times 10^4$ Pa.

The time over which the aroma is recovered from fresh leaf tea (e.g. by drying in one or more low-convection dryers) is typically less than 8 hours, more preferably less than 5 hours. It is particularly preferred that the timeframe for recovery of aroma is the range of 5 minutes to 5 hours. The time taken for aroma recovery is dependent on the type and size of dryer employed. When a batch type of dryer is used, the aroma recovery time is preferably in the range of 1 to 5 hours. When a continuous drying unit is used, sufficient aroma could be recovered in 5 to 30 minutes of residence time of the tea in the dryer or dryers.

The aroma is preferably recovered as a condensate. For example, the exhaust gases from the dryer are directed to a condenser and the aroma compounds along with the water are condensed using a condenser temperature of less than 50° C., preferably less than 35° C., furthermore preferably in the range of −5° C. to 30° C.

The condensate obtained may be concentrated by any one of the known processes. For example, the aroma may be concentrated by reverse osmosis, distillation, cryo-concentration, freeze drying, and/or staged/partial condensation to prepare a tea aroma concentrate. It is particularly preferred to use the process of distillation for the concentration. The tea aroma is preferably concentrated to an aroma content of at least 25 mg/L, more preferably at least 1000 mg/L, more preferably still at least 5000 mg/L, and most preferably to an aroma content in the range of 10,000 mg/L to a concentrate that is purely aroma oil (e.g. 900 g/L).

Alternatively, the condensate may be adsorbed on to one or more adsorbents selected from activated charcoal, resins, zeolites, and tea (e.g. black tea). The adsorbent may be packed in a column or fluidised bed and later desorbed to release the aroma components using thermal treatment, organic solvents or super critical $CO_2$. When the exhaust gases are adsorbed on to tea itself, further desorption is not necessary.

Optional Steps:

After the recovery of aroma from the dhool, the residual dhool may be dried to produce a leaf tea product. Preferably the moisture content of the dhool after step (c) is in the range of 35 to 55% by weight, more preferably 40 to 55% by weight and most preferably 45 to 50% by weight. During the drying step, the dhool is preferably dried to moisture content of less than 10% by total mass of the tea leaf, more preferably less than 5% by total mass of the tea leaf, to obtain the leaf tea product. The drying preferably be performed at a temperature in the range of 80 to 160° C., more preferably 90 to 150° C., most preferably 100 to 130° C.

The drying step is preferably carried out by thermal drying, freeze drying or vacuum drying.

The present invention also provides a tea aroma wherein the floral to green ratio is greater than 2, preferably greater than 2.2 and more preferably greater than 2.5. The floral to green ratio preferably in the range of 2 to 6, more preferably 3 to 6 and most preferably 3 to 5.

The tea aroma as obtained by the process of the present invention having linalool to t-2-hexenal ratio greater than 4, preferably greater than 4.5 and more preferably greater than 5. The preferred ratio of linalool to t-2-hexenal is in the range of 4 to 10, more preferably 4 to 8 and most preferably 5 to 7.

The present invention also provides a tea product comprising the tea aroma as disclosed above. The tea product preferably comprises 0.1 to 10%, more preferably 0.5 to 8%, furthermore preferably 0.5 to 5% and most preferably 0.5 to 4% of tea aroma by weight of the tea product.

Now the invention will be demonstrated in terms of examples. The following examples are just for illustration and in no way limits the scope of the present invention.

EXAMPLES

All the experiments were carried out in Kenya using tea leaf obtained from a Kenyan tea garden.

The following tea products were prepared, and aroma were recovered using the procedure described below:

Example A

Fresh tea leaves were harvested from a Kenyan tea garden, and withered for 18 hours at about 25° C. The withered leaves were subjected to CTC (cut tear curl) for 4 times to obtain macerated dhool. The macerated dhool was fermented (exposed to air at 25° C.) for 90 minutes. A 120 kg batch of fermented tea dhool (with a water content of about 70% by weight) was dried in a rotary vacuum dryer using a vacuum at $1.5 \times 10^4$ Pa (150 mbar) and a surface temperature of 115° C. for 30 minutes. The dhool was dried to a moisture content of 55%. About 20 L of condensate was collected.

Example 1

Fresh tea leaves (moisture content 77%) were procured from the tea garden in Kenya. These tea leaves were put in an air-tight aseptic plastic bag, sealed and incubated for 18 hours. Following the incubation period, the tea leaves were subjected to CTC (cut tear curl) for 4 times to obtain macerated dhool. The macerated dhool was fermented (exposed to air at 25° C.) for 90 minutes. A 120 kg batch of fermented tea dhool (with a water content of about 70% by weight) was dried in a rotary vacuum dryer using a vacuum at $1.5 \times 10^4$ Pa (150 mbar) and a surface temperature of 115° C. for 30 minutes. The dhool was dried to a moisture content of 55%. About 20 L of condensate was collected.

The aroma condensate was analyzed by Gas Chromatography (GC) using the procedure as described below:

Gas chromatography (GC) was used to characterize the aroma profile of the aroma condensate obtained above.

5 mL of the aroma condensate was taken for analysis in a capped GC vial. Aroma was measured in the headspace using a SPME fibre after the samples were pre-incubated (10 min) and then kept at 70° C. for 20 min. The conditions for gas chromatography and aroma extraction by SPME (solid phase micro extraction) are given below.

GC-FID Conditions:

Volatile compounds from aroma condensate were analysed using a gas chromatograph with a FID detector (Perkin Elmer auto System XL). A CP-wax 52 CB (30 m×0.25 mm, film thickness 0.15 μm) column was used for analysis. The injector was operated at a split ratio of 1:5 with helium as the carrier gas at a constant flow rate of 1.0 mL/min. The injector was maintained at 230° C. The detector temperature was maintained at 250° C. The oven temperature was set at 45° C. throughout the experiment.

SPME Conditions:

Analysis of volatile compounds released from the aroma condensate was carried out using SPME. More particularly, a 2 cm stable flex fiber, coated with 50/30 μm poly(divinylbenzene) (DVB)/carboxen (CAR)/poly(dimethylsiloxane) (PDMS) (Supelco, Bellefonte, Pa.) was used with automated SPME system (Combi PAL system).

Equipment Specifications and Experimental Conditions:
SPME Fiber: Grey fiber (PDMS/DVB/CAR)
Pre-Incubation time: 10:00 min
Incubation temp: 70° C.
Needle Penetration: 10 mm
Fiber Penetration: 20 mm
Extraction Time: 20:00 min
Desorb to: GC Injector port 1
Injection Time: 5:00 min
Post fiber Condition time: 15 min
GC Run time: 50 min
Cooling time: 10 min
Fiber conditioning temp: 230° C.

The peak area is calculated for the individual volatile compounds from the GC chromatograms. Standard concentration curves are generated for each volatile. These standard curves are used to convert the peak area to a concentration for the respective volatiles.

The results are summarized below in Table 1.

TABLE 1

| Aroma volatile | Amount of aroma volatile (μg/mL) | |
|---|---|---|
| | Example A | Example 1 |
| Floral notes signature molecules | | |
| Linalool oxides | 12.45 | 8.65 |
| Linalool | 42.04 | 20.01 |
| Methyl salicylate | 3.83 | 2.75 |
| Geraniol | 4.14 | 2.65 |
| Green notes signature molecules | | |
| Hexanal | 1.04 | 0.09 |
| Cis-3-hexenal | 16.84 | 7.96 |
| t-2-hexenal | 18.14 | 2.90 |
| Ratio of floral notes to green notes | 1.73 | 3.11 |
| Ratio of linalool to t-2-hexenal | 2.32 | 6.90 |

From the above table it is evident that Example 1 provides a tea aroma which has much higher floral to green ratio when compared with control tea aroma (Example A). It is also noted that the ratio of linalool to t-2-hexenal for Example 1 is almost three times higher than that of Example A.

Therefore, it is clear that the present invention provides a tea aroma which has excellent floral notes and much higher linalool to t-2-hexenal ratio when compared to known aroma recovery process.

The invention claimed is:

1. A process for recovering aroma from tea leaf comprising the steps of:
    a. incubating fresh tea leaf at a temperature in the range 4° C. to 80° C. under anaerobic conditions for a period of 4 to 72 hours;
    b. subjecting the incubated leaf to comminution to produce dhool;
    c. fermenting the comminuted dhool; and
    d. recovering aroma from the dhool while partially drying the dhool in a low-convection dryer;
    wherein the fermentation is carried out by keeping the dhool at a temperature in the range of 10° C. to 60° C. for 15 minutes to 5 hours.

2. The process of claim 1, wherein the low convection dryer is selected from the group consisting of a vacuum dryer, a rotary vacuum dryer, a batch or continuous vacuum plate dryer, and a superheated steam dryer.

3. The process of claim 1, wherein the partial drying is carried out under vacuum.

4. The process of claim 3, wherein said vacuum corresponds to a pressure of $1.01 \times 10^3$ Pa to $2.03 \times 10^4$ Pa atmosphere absolute.

5. The process of claim 1, wherein there is an inlet non-condensable gas flowing into said low-convection dryer.

6. The process of claim 1, wherein exhaust gases from said low convection dryer are cooled to prepare a condensate rich in tea aroma.

7. The process of claim 6, wherein the condensate is distilled further to obtain pure aroma concentrate.

8. The process of claim 1, wherein the dhool obtained after recovering of aroma in step (c) undergoes fermentation.

9. The process of claim 1, wherein the moisture content of the dhool after step (c) is in the range of 40 to 55% by weight.

10. The process of claim 1, wherein the anaerobic conditions are achieved by:
    i. placing the fresh tea leaf in a container, and closing the container, or;
    ii. placing the tea leaf in a container, purging a gas essentially free of oxygen through the container, and closing the container, or placing the leaf in an airtight chamber or under vacuum.

11. The process of claim 10, wherein the anaerobic conditions are achieved by placing the fresh tea leaf in a container and closing the container.

* * * * *